US 6,715,143 B1

(12) United States Patent
Chantrain et al.

(10) Patent No.: US 6,715,143 B1
(45) Date of Patent: Mar. 30, 2004

(54) METHOD FOR INSTALLING SOFTWARE COMPONENTS AT A USER-TERMINAL, RELATED DEVICES AND RELATED SOFTWARE MODULE

(75) Inventors: Dominique Helena Lucia Chantrain, Edegem (BE); Hans Vanderstraeten, Lebbeke (BE); Werner Adriaan Josephine Van Leekwijck, Antwerp (BE)

(73) Assignee: Alcatel, Paris (FR)

( * ) Notice: Subject to any disclaimer, the term of this patent is extended or adjusted under 35 U.S.C. 154(b) by 343 days.

(21) Appl. No.: 09/686,825

(22) Filed: Oct. 12, 2000

(30) Foreign Application Priority Data

Oct. 15, 1999 (EP) .............................. 99402554

(51) Int. Cl.[7] ............................................. G06F 9/445
(52) U.S. Cl. ....................................... 717/174; 717/178
(58) Field of Search ................................ 717/168–178; 709/200, 217–218, 219, 223, 225, 227, 249, 310

(56) References Cited

U.S. PATENT DOCUMENTS

| 5,835,721 A | * | 11/1998 | Donahue et al. ............ 709/224 |
| 5,845,077 A | * | 12/1998 | Fawcett ...................... 709/221 |
| 5,940,074 A | | 8/1999 | Britt, Jr. et al. |
| 6,009,274 A | * | 12/1999 | Fletcher et al. ............. 717/173 |
| 6,049,671 A | * | 4/2000 | Slivka et al. ............... 717/173 |
| 6,073,214 A | * | 6/2000 | Fawcett ...................... 711/133 |
| 6,327,617 B1 | * | 12/2001 | Fawcett ...................... 709/219 |
| 6,381,741 B1 | * | 4/2002 | Shaw .......................... 717/168 |
| 6,516,346 B1 | * | 2/2003 | Asco et al. .................. 709/221 |

FOREIGN PATENT DOCUMENTS

GB        2 333 865 A    8/1999

OTHER PUBLICATIONS

Hall et al. A Cooperative Approach to Support Software Deployment Using the Software Dock. ACM. 1999. pp. 174–183.*
Flavin et al. Managment of Distributed Applications in Large Software. IEEE. 1988. pp. 232–241.*

* cited by examiner

Primary Examiner—Wei Zhen
(74) Attorney, Agent, or Firm—Sughrue Mion, PLLC

(57) ABSTRACT

The present invention provides a method and related devices for installing software components at a user-terminal of a plurality of user-terminals in a communications-network. This communications network further consists of a plurality of hosts and a plurality of network gateways. The user-terminal is connected to one of the network gateways.

The network gateway receives a connection request from a user-terminal to establish a connection between the user-terminal and one of the hosts and detects if the software components are available at the user-terminal. If the software components are not available, the network gateway sets the establishment of the connection between the user-terminal and the host in hold and subsequently establishes a connection between the user-terminal and a service provisioning network element that also is included in the communications network. The service provisioning network element downloads the software components to the user-terminal over a established connection between the user-terminal and the service provisioning network element. The network gateway resumes the establishment of the connection between the user-terminal and the host upon detection of the end of the download.

16 Claims, 2 Drawing Sheets

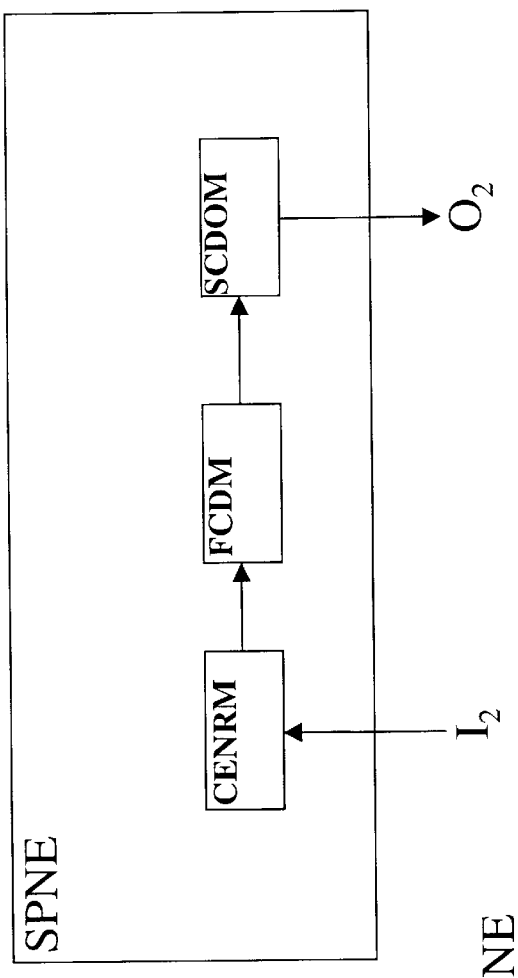
FIG.2: SPNE
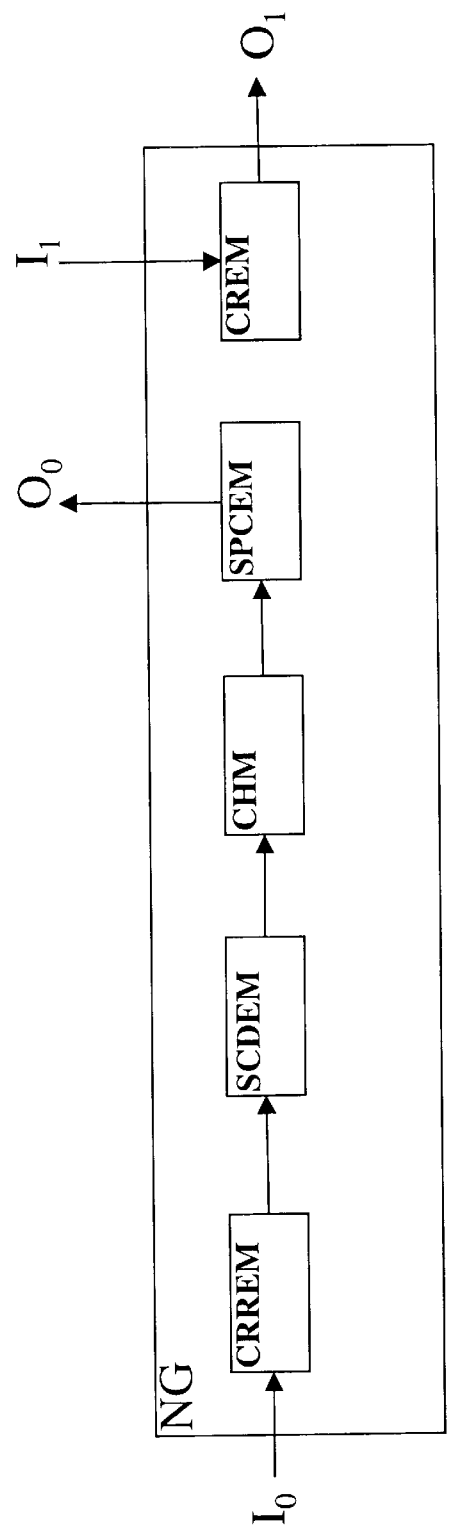
FIG.3: NG

METHOD FOR INSTALLING SOFTWARE COMPONENTS AT A USER-TERMINAL, RELATED DEVICES AND RELATED SOFTWARE MODULE

BACKGROUND OF THE INVENTION

The present invention relates to a method used for installing software components at a user-terminal and the related devices.

The method refers to installing one or more software components at a user terminal to provide the user of this user-terminal with a kind of functionality that enables the user to access a host or a kind of service provided by this host which can be a service provider.

These software components are software components that are necessary for providing a user of a user terminal with a basic functionality, like an internet browser and possible other software components necessary to get this internet-access in case of the internet service provider.

The installation of software components is currently done by using a floppy-disk or a CD-ROM, like the floppy-disk or a CD-ROM an internet service provider provides the user with, in order to get internet access. The user has to retrieve these software components from the floppy-disk or a CD-ROM to install them at the user-terminal.

This consequently requires an explicit installation step of this software. This installation procedure is sometimes too difficult for the user, resulting in significant deployment costs for the service provider. Besides this, the service provider does not have any means to guarantee that the user will install the software components and consequently he will have no means to control or manage the functionality on a user terminal.

SUMMARY OF THE INVENTION

An object of the present invention is to provide a method of the above known type but wherein the software modules are installed at the user terminal where the contribution of the user of the terminal is reduced to a minimum. A further object of the present invention is to provide a service provider with means to control to a certain degree the functionality of a user-terminal and to reduce deployments costs.

According to the invention, this object is achieved by a method for installing software components at a user-terminal of a plurality of user-terminals in a communications-network, the communications network further comprising, a plurality of hosts and a plurality of network gateways, where the user-terminal is connected to a network gateway of said plurality of network gateways, the method comprising the steps of: the network gateway receiving a connection request from the user-terminal to establish a connection between the user-terminal and a host of the plurality of hosts, the network gateway detecting if the software components are available at the user-terminal; and performing the following steps if the software components are not available:

the network gateway holding said establishment of said connection between the user-terminal and the host;

the network gateway establishing a connection between the user-terminal and a service provisioning network element also included in the communications network;

the service provisioning network element downloading to the user-terminal the software components from the service provisioning network element over the established connection between the user-terminal the and said service provisioning network element; and the network gateway resuming said establishing of said connection between said user-terminal and the host upon detection of the end of the download.

The object of the invention is further achieved by a network gateway comprising: connection request reception and establishing means, adapted to receive a connection request from the user-terminal to establish a connection between the user-terminal and a host, wherein the network gateway further comprises: software component detection means, coupled with an input to an output of the connection request reception and establishing means and adapted to detect if the software components are available at the user-terminal; connection holding means, coupled with an input to an output of the software component detection means and adapted to hold said establishment of said connection between the user-terminal and the host; service provisioning connection establishment means, coupled with an input to an output of the connection holding means and adapted to establish a connection between the user-terminal and a service provisioning network element also included in the communications network and to notify the service provisioning network element to download the software components over the connection; and connection re-establishment means, adapted to resume the establishing of the connection between the user-terminal and the host upon detection of the end of the download.

The object of the invention is still further achieved by a service provisioning network element comprising: connection establishment notification reception means, adapted to receive a notification of an established connection between the service provisioning network element and the user terminal; and software component downloading means, coupled with an input-terminal to an output-terminal of the connection establishment notification reception means and adapted to download to the user-terminal software components from the service provisioning network element over the established connection between the user-terminal and the service provisioning network element. In this way, by forcing a user-terminal at use of this terminal to contact a service provisioning network element, this service provisioning network element will provide the user with the required software components. If a user terminal contacts a Network Gateway, constituting the communications network edge and being owned by a service provider, in order to connect to some point, a host in the communications network, e.g. a server or second user terminal, the Network Gateway will check whether the software components are already installed on this terminal. If the software components are not yet installed, the Network Gateway will connect the user terminal to the service provisioning network element, that has the needed software components at its disposal and which will take care of the installation of this software components at the user terminal. After the installation of the software components has finished, the Network Gateway will connect the user to the originally requested destination, the server or a second user terminal.

Another characteristic feature of the present invention resides in the method described above wherein the method further comprises between the establishing and downloading steps, the step of detecting if the software components are available at the user-terminal by the service provisioning network element.

In this way when the user terminal is connected to the service provisioning network element, the service provisioning network element can itself determine which software components are needed at the user-terminal and consequently which kind of software components have to be downloaded by the service provisioning network element to the user-terminal.

Still another characteristic feature of the present invention resides in the method as described above wherein the software components are initial software components.

In case the user terminal connects for the first time to the network gateway or to the service provisioning network element it is detected whether or not the initial software components are available at the user terminal and consequently determined whether or not the initial software components have to be downloaded to the user-terminal. This feature is useful in situations where the user-terminal needs an initial software packet in order to be able to perform specific further actions.

BRIEF DESCRIPTION OF THE DRAWING

The above and other objects and features of the invention will become more apparent and the invention itself will be best understood by referring to the following description of an embodiment taken in conjunction with the accompanying drawings wherein:

FIG. 2 represents the functional representation of the service provisioning network element SPNE as presented in FIG. 1; and FIG. 3 represents the functional representation of the Network gateway as presented in FIG. 1.

DETAILED DESCRIPTION OF THE INVENTION

Figure 1:
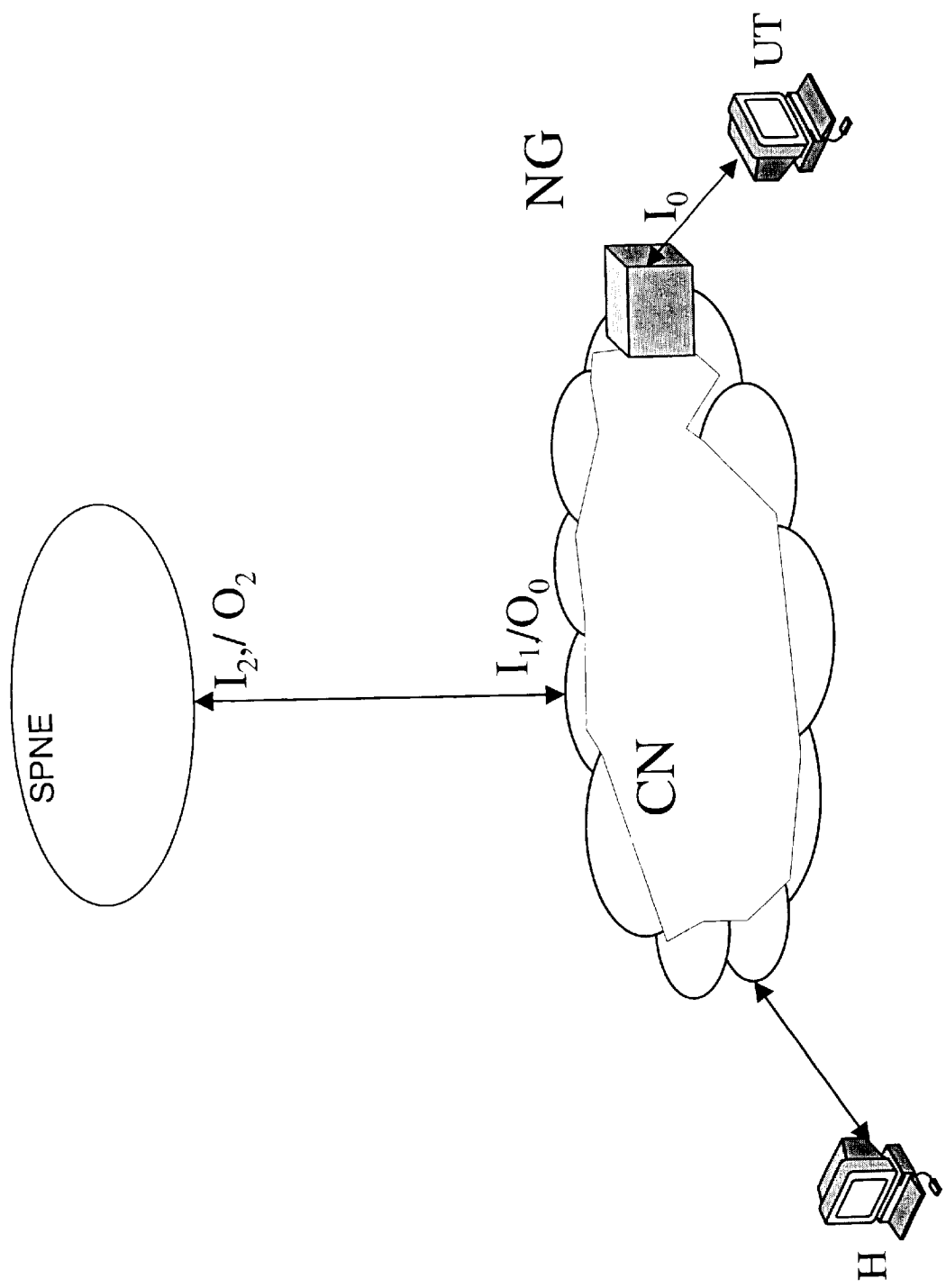
FIG. 1 represents a communications network CN.

In the following paragraphs, referring to the drawings, an implementation of the method according to the present invention will be described. In the first paragraph of this description the main elements of this method used for installing software components at a user-terminal in a communications network and corresponding devices are described. In the second paragraph, all connections between the before mentioned network elements and described means are defined. In the succeeding paragraph the actual execution of the method system is described.

The essential elements of the communications network of the embodiment according to the present invention are a user terminal UT, a communications network CN, a network gateway NG, a host H and the service provisioning network element SPNE as shown in FIG. 1.

In order to keep simplicity in this description it is chosen to only describe one user terminal UT although this normally is plurality of user terminals. The user terminal UT comprises a processor and a program storage device whereon software can be installed. In this embodiment this user terminal is a personal computer. Further, also in order to keep simplicity in this description it is chosen to only describe one host although this normally is plurality of hosts in a communications network. This host in this embodiment is chosen to be a server. It is to be remarked that this host also may be chosen a second user-terminal.

The network gateway NG is a gateway constituting the edge of the communications network and is implemented with the Alcatel Data Application Network Adapter DANA and possessed by and under control of the network provider. It is here to be remarked that this network gateway also could have been implemented by a network termination device such as for example the Alcatel ADSL network termination.

The service provisioning network element SPNE is a network element that enables the network provider to provide a user terminal UT with the necessary software components in order to get access to the provider's services. This service provisioning network element has all necessary software components for different user terminals at its disposal.

The user terminal is coupled to the network gateway NG via the ADSL access network. The service provisioning network element SPNE is coupled via a TCP/IP connection to the communications network CN.

The service provisioning network element SPNE as presented in FIG. 2 is built up of a first time connect detection means FCDM that is able to detect if the user-terminal connects the first time to the network gateway and a software component downloading means SCDOM, that is adapted to download software components by the user-terminal from the service provisioning network element SPNE over the established connection between the user-terminal and this service provisioning network element SPNE.

The first time connect detection means FCDM has an input-terminal that is at the same time an input-terminal $I_2$ of the service provisioning network element SPNE. The first time connect detection means FCDM is has an output-terminal that is coupled to an input-terminal of the software component downloading means SCDOM that further has an output-terminal being at the same time an output-terminal $O_2$ of the service provisioning network element SPNE.

The network gateway as presented in FIG. 3 is built up of a connection request reception and establishing means CRREM that is adapted to receive a connection request from a user-terminal to establish a connection between this user-terminal and a host. Further there is an software component detection means SCDEM that is adapted to detect if the software components are available at this user-terminal, and a connection holding means CHM that is able to hold the establishment of the connection between this user-terminal and the host. Further there is a service provisioning connection establishment means SPCEM adapted to establish a connection between the user-terminal and the service provisioning network element SPNE in order to get the software components downloaded. Then there still is a connection re-establishment means CREM that is adapted to resume the establishment of the connection between this user-terminal and the host H.

The connection request reception and establishing means CRREM has an input-terminal that is at the same time an input-terminal $I_0$ of the network gateway NG. The connection request reception and establishing means CRREM has an output-terminal that is coupled to an input-terminal of the software component detection means SCDEM. The software component detection means SCDEM is coupled with an output-terminal to an input-terminal of the connection holding means CHM that in its turn is coupled with an output-terminal to an input-terminal of the service provisioning connection establishment means SPCEM. The service provisioning connection establishment means SPCEM has an output-terminal being at the same time an output-terminal $O_0$ of the Network Gateway NG. The connection re-establishment means CREM has an input-terminal being at the same time an input-terminal $I_1$ of the Network Gateway NG and further has an output-terminal being at the same time an output-terminal $O_1$ of the network gateway NG.

In order to explain the operation of the present invention it is assumed that there is a user-terminal UT connected to the network gateway NG that intends to connect to a host H.

It is also assumed that this user terminal UT will be connected for the first time to the network gateway NG. Consequently this user-terminal UT only has the software of the first installation available, but not the so called software components that are necessary for the network provider, for instance to detect which software is available at the terminal of the user-terminal in order to supply the user with additional services through the network and additional to be installed software at the terminal of the user-terminal UT. In order to establish the connection, the user-terminal UT sends a connection request to the network gateway NG. The connection request reception and establishing means CRREM of the network gateway NG then receives this connection request from this user-terminal UT. The connection request reception and establishing means CRREM then forwards this request to the software component detection means SCDEM that subsequently is triggered to detect if the meant software components are available at the user-terminal UT from the type of connection request. If the software components are not found to be available at the user-terminal UT, the connection holding means CHM sets the connection establishment of the connection between this user-terminal UT and the host H in hold and subsequently the service provisioning connection establishment means SPCEM establishes a connection between the user-terminal UT and the service provisioning network element. The connection establishment notification reception means CENRM then receive a notification of an established connection between the service provisioning network element SPNE and the said user-terminal UT. The first time connect detection means FCDM then checks if the user-terminal UT connects for the first time to the service provisioning network element SPNE and if so the software component downloading means SCDM will handle the download of the software components from the service provisioning network element SPNE over the established connection between the first user-terminal UT and the service provisioning network element SPNE and handle the installation of the software of user-terminal UT. After the installation of the software components at the computer of the user-terminal UT the connection re-establishment means CREM of the network gateway resume the establishment of the connection between the user-terminal UT the host H. The end of the download of these software components may be determined in a number of different ways, for instance by a trigger sent by the service provisioning network element SPNE or by the just installed components on the user-terminal itself.

It is to be remarked that if the software component detection means SCDEM finds out that the software components are already installed at the computer of the user-terminal UT the connection establishment, of the connection between the user-terminal and the host H, is not set in hold but proceeded without any further intervention.

Although the above embodiment of the invention has been described by means of functional blocks, their detailed realisation based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

What is claimed is:

1. A method for installing software components at a user-terminal of a plurality of user-terminals in a communications-network, said communications network comprising a plurality of hosts and a plurality of network gateways, where said user-terminal is coupled to a network gateway of said plurality of network gateways, said method comprising:
    a. said network gateway receiving a connection request from said user-terminal to establish a connection between said user-terminal and a host of said plurality of hosts, characterized in that said method further comprises the steps of:
    b. said network gateway detecting whether said software components are available at said user-terminal; and performing the following steps when said software components are not available:
    c. said network gateway holding said establishment of said connection between said user-terminal and said host;
    d. said network gateway establishing a connection between said user-terminal and a service provisioning network element also included in said communications network;
    e. said service provisioning network element downloading to said user-terminal said software components from said service provisioning network element over said established connection between said user-terminal and said service provisioning network element; and
    f. said network gateway resuming said establishing of said connection between said user-terminal and said host upon detection of an end of said download.

2. The method for installing software components at a user-terminal according to claim 1 characterized in that said method further comprises between the steps d and e, the step of detecting whether said software components are available at said user-terminal by said service provisioning network element.

3. The method for installing software components at a user-terminal according to claim 1, characterized in that said software components are initial software components.

4. The method of claim 1, wherein said host is a server.

5. The method of claim 1, wherein said host is another user terminal.

6. The method of claim 1, wherein said end of said software download is determined by a trigger sent by the service provisioning network element.

7. The method of claim 1, wherein said end of said software download is determined by software components installed in said user terminal during said software download.

8. A Network Gateway for installing software components at a user-terminal of a plurality of user-terminals in a communications-network, said communications network comprising a plurality of hosts and a plurality of network gateways, where said user-terminal of said a plurality of user terminals is connected to a network gateway of said plurality of network gateways, said network gateway comprising the following means:
    a. connection request reception and establishing means, adapted to receive a connection request from said user-terminal to establish a connection between said user-terminal terminal and a host, characterized in that said network gateway (NG) further comprises the following means:
    b. software component detection means, coupled with an input to an output of said connection request reception and establishing means and adapted to detect whether said software components are available at said user-terminal;

c. connection holding means, coupled with an input to an output of said software component detection means and adapted to hold said establishment of said connection between said user-terminal and said host;

d. service provisioning connection establishment means, coupled with an input to an output of said connection holding means and adapted to establish a connection between said user-terminal and a service provisioning network element also included in said communications network and to notify said a service provisioning network element to download said software components over said connection; and e. connection re-establishment means, adapted to resume said establishing of said connection between said user-terminal and said host upon detection of the end of said download.

9. The network gateway of claim 8, wherein said host is a server.

10. The network gateway of claim 8, wherein said host is another user terminal.

11. The network gateway of claim 8, wherein said end of said software download is determined by a trigger sent by the service provisioning network element.

12. The network gateway of claim 8, wherein said end of said software download is determined by software components installed in said user terminal during said software download.

13. A service provisioning network element for installing software components at a user-terminal of a plurality of user-terminals in a communications-network, said communications network comprising, a plurality of hosts and a plurality of network gateways, where said user-terminal is coupled to a network gateway of said plurality of network gateways, said service provisioning network element being part of said communications network, said service provisioning network element comprising the following means:

a. connection establishment notification reception means, adapted to receive a notification of an established connection between said service provisioning network element and said user terminal; and b. software component downloading means, coupled with an input-terminal to an output-terminal of said connection establishment notification reception means and adapted to download to said user-terminal software components from said service provisioning network element over said established connection between said user-terminal and said service provisioning network element.

14. The service provisioning network element of claim 13, further comprising a first time connect detection means for detecting whether said user terminal connects to said network gateway for a first time based on an input received from said connection establishment notification reception means, and when said user terminal connects to said network gateway for said first time, generating an output to said software component downloading means requesting said download.

15. A computer-readable medium including a set of instructions that comprise a software module, for running on a processing system for inclusion in a Service provisioning network element, for installing software components at a user-terminal of a plurality of user-terminals in a communications-network, said communications network comprising a plurality of hosts and a plurality of network gateways, where said user-terminal is coupled to a network gateway of said plurality of network gateways, said service provisioning network element being part of said communications network, said software module comprising the following software sub-modules:

a. a connection establishment notification reception sub-module, adapted to receive a notification of an established connection between said service provisioning network element and said user terminal; and b. a software component downloading sub-module, co-operating with said connection establishment notification reception sub-module and adapted to download to said user-terminal software components from said service provisioning network element over said established connection between said user-terminal and said service provisioning network element.

16. The computer-readable medium of claim 15, further comprising a first time connect detection sub-module detecting whether said user terminal connects to said network gateway for a first time based on an input received from said connection establishment notification reception sub-module, and when said user terminal connects to said network gateway for said first time, generating an output to said software component downloading sub-module requesting said download.

* * * * *